Feb. 2, 1932.   A. M. BOEVER   1,843,476
COFFEE MAKER OR THE LIKE
Filed July 16, 1928

INVENTOR
ANNE M. BOEVER

BY
ATTORNEY.

Patented Feb. 2, 1932

1,843,476

UNITED STATES PATENT OFFICE

ANNE M. BOEVER, OF CAMBRIDGE, MASSACHUSETTS, ASSIGNOR TO THE SILEX COMPANY, A CORPORATION OF CONNECTICUT

COFFEE MAKER OR THE LIKE

Application filed July 16, 1928. Serial No. 292,931.

My invention relates to coffee makers or the like.

It has for its object to provide an improved and simplified arrangement and construction of the supporting and heating means including the heating element support, the tray, and the supporting means for the receptacle to be heated. Other objects of my invention are to provide an improved device including an improved construction of combined heating element support and tray and an improved construction of bowl support, and also having its parts arranged in an improved and simplified combination. Further objects of my invention are to provide such an improved structure capable of presenting an attractive appearance, and especially adapted to table use, and to use with a glass bowl, for example forming the lower bowl of a coffee maker, and more particularly, to use with such a bowl having rounded sides adjacent its bottom. A still further object of my invention is to provide such an improved construction adapted to be manufactured at small expense. These and other objects and advantages of my improved construction will, however, hereinafter more fully appear.

In the accompanying drawings, I have shown for purposes of illustration, one embodiment which my invention may assume in practice.

In these drawings,—

Figure 1:
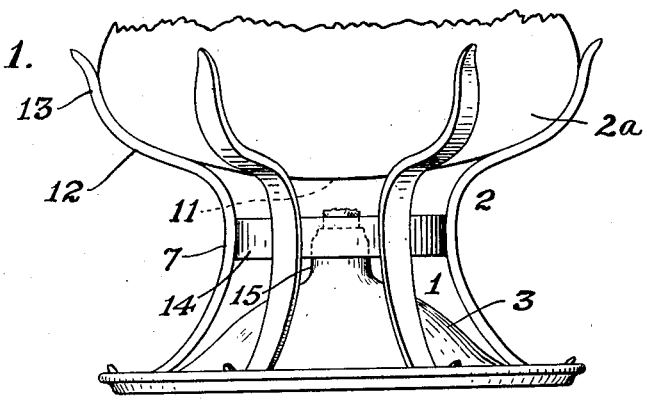
Figure 1 is a side elevation of one form of my improvement with a coffee bowl thereon, this device being of the alcohol heated type.
Figure 2:
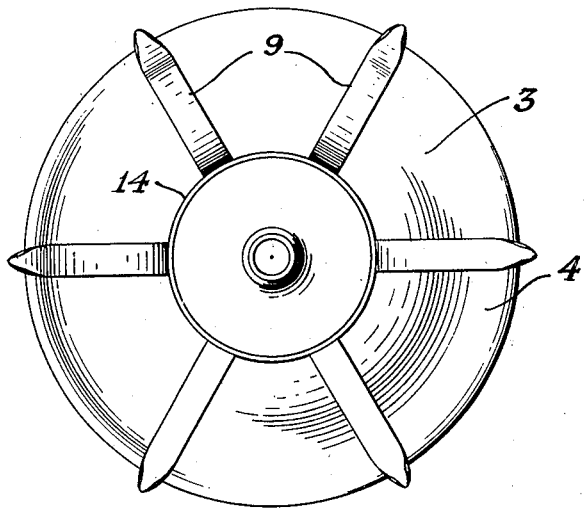
Fig. 2 is a plan view with the bowl removed.
Figure 3:
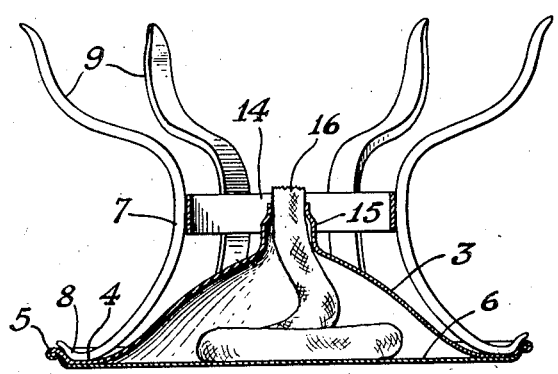
Fig. 3 is a vertical sectional view of the structure shown in Fig. 1, the bowl being removed.

Considering the illustrative construction, it will be noted that I have shown an improved structure comprising an improved combined heater support and tray, generally indicated at 1, an improved bowl support, generally indicated at 2, supported thereon in an improved manner and in turn supporting a bowl 2a, the curved bottom of which is shown in Fig. 1.

Considering more particularly the structure of the improved combined tray and heater support, it will be noted that the heater support is provided with a hollow raised portion 3, herein of generally conical form and provided with sides sloping away toward their bottom and merging in a peripheral surface 4 forming a peripheral tray surface. Herein, this surface 4 is also surrounded by an upstanding curved portion 5 forming a tray edge or margin. Further, the bottom of the support 2, herein illustrated at 6 and preferably suitably integrally united with the portions 3, 4 and 5, extends horizontally under the whole device, the same thereby forming not only the bottom for the heater support 3, but the bottom of the peripheral tray and herein also having an upturned peripheral flange integrally united with the edge 5 of the tray.

Herein it will also be noted that disposed outside the portion 3 is an improved bowl support 7 having at its lower end supporting means 8 resting upon the tray portion 4 heretofore described, and at its upper end more widely spread and longer upwardly and laterally extending means 9 forming an improved bowl support and so disposed as to locate a bowl above and properly spaced from the top of the member 3 and hold the bowl against tilting. More particularly, it will be noted that this bowl support 7 comprises a series of radially located separate supports so disposed and shaped as effectually to prevent tilting, and herein six in number. Herein, these supports not only have outwardly extending feet adapted to fit the portion 4 at the bottom, but are also so outwardly and upwardly deflected at the top as to provide improved bowl engaging supporting and locating surfaces including lateral supporting surfaces 12 and upstanding abutments or outer end portions 13 adapted to receive and snugly support the rounded sides of the lower bowl 11 of a coffee maker or the like while spacing the contacts therewith around the axis of the bowl from one another. Herein, as preferably, these supports are also connected together substantially below their upper ends, as by an annular member 14 herein also preferably inside the same and at a point adjacent the top of the heater support 3, so that the means 7 is in the form of a unit. If desired, this support 7 may be removably supported on the surface 4, heretofore described, but preferably the lower ends 8 thereof are integrally united to the upper surface of 4 so that the whole device forms an integrally united structure adapted to be picked up and handled as a whole either by the edge 5 of the tray 4 or by gripping one or more of the support members adjacent the bottom.

In the form of my invention shown, I have illustrated my improved device as adapted to use with an alcohol burner, the space within the hollow heater support and between the top thereof and the tray bottom, forming the reservoir for the alcohol, and a hollow projection 15 being provided on the upper surface of the portion 3 through which a usual wick 16 is extended. Thus it will be noted that a source of heat is provided which is so located as to cause the heat to flow over the bottom of the bowl supported on the upper ends of the support 7 and be evenly distributed over the bottom and in a manner enabling the flame to illumine the coffee in the clear glass bowl and produce an exceedingly attractive effect. Attention is also directed to the fact that due to the location of the members comprised in the support 7 and the improved structure of the upper end of the support 7 including the lateral supporting surfaces 12 and the upwardly extending outer abutments 13, it is made possible to support a bowl having rounded sides, adequately and securely in position against tilting from any angle and without requiring a supporting ring.

As a result of my improved construction, it will be evident that, as distinguished from a separable alcohol stove or the like having no tray function, I am enabled to provide a single element which combines the functions of the same and a tray, thereby substantially simplifying and cheapening the construction while rendering it much more convenient and attractive. For example, all necessity for providing a separate support or stand for a removable lamp is eliminated, since my combined element performs both functions. Further, in my improved construction shown, wherein the raised portion of the member 3 and its bottom are so arranged and connected as to form the tray portion, it is made possible to provide this construction very inexpensively with a minimum of material. Through my improved supporting means, herein comprising the radially arranged prong members, it will also be noted that it is made possible to support a bowl having rounded sides, and more particularly, a thin glass bowl of this shape, at radially spaced points in such manner as to minimize breakage as a result of heating and as compared with structures wherein the supports are in the form of rings or portions of rings extending around the axis of the bowl, and wherein the result of expansion and contraction under heat is to cause cracking and breaking out of the bottom of the bowl. It will, moreover, be noted that these radially disposed prongs are so spaced as not only to eliminate this breakage but also to prevent objectionable tilting of the bowl in any direction. Attention is also directed to the fact that this prong construction is also capable of being provided very economically and with a minimum of material. Through connecting the prong members to the peripheral tray, it is also made possible to provide a unit adapted to be conveniently handled and from which it is impossible to drop the heating unit. These and other advantages of my improved construction will, however, be clearly apparent to those skilled in the art.

While I have in this application specifically described one form which my invention may assume in practice, it will be understood that the same is shown herein for purposes of illustration only, and that the invention may be further modified and embodied in various other forms without departing from its spirit or the scope of the appended claims.

What I claim as new and desire to secure by Letters Patent is:

1. In a heater for coffee maker bowls, individual upstanding bowl supporting and positioning prongs having free upper ends extending upward above the bottom of the bowl co-operating to present an open bowl clasp within the upper ends thereof and engaging the bowl radially adjacent its bottom to inhibit bowl shifting, means connected to said prongs below said clasp forming a rigid unit, and means for heating a bowl in said clasp having heater carrying means rigidly connected to said unit.

2. In combination with the lower bowl of a coffee maker, a plurality of individual radially disposed bowl positioning prongs extending above the bowl bottom and engaging the sides of the bowl adjacent its bottom and co-operating to form a bowl clasp within the upper ends thereof, means connected to said prongs intermediate their ends forming a rigid unit, and tray means supporting the lower ends of said prongs and connecting them into a rigid unit.

3. In a support for a coffee maker bowl, radially disposed bowl positioning prongs extending above the bowl bottom and engaging the sides of the bowl adjacent said bottom at a multiplicity of points inhibiting bowl shifting, said prongs having a constricted portion intermediate their ends heating means disposed axially within said constricted portion and spaced below said bowl bottom, prong connecting means engaging the constricted portion of said prongs, and tray means carrying said elements.

4. In a support for a coffee maker bowl, a plurality of individual bowl positioning prongs extending above the bowl bottom and engaging the sides of the bowl adjacent its bottom holding the bowl against shifting while exposing the bottom and sides thereof for a free flow of heat or atmospheric air over the same, heating means located axially within said prongs and spaced below and acting on the exposed bowl bottom, prong connecting means connecting said prongs intermediate their ends, and a tray rigidly connected to said connecting means and disposed beneath the lower ends of said prongs supporting the parts and forming a rigid unit therewith.

5. In a heater for coffee maker bowls, a bowl support having individual bowl positioning prongs inhibiting bowl shifting and co-operating to present a bowl clasp within the upper ends of said prongs, heating means disposed axially within said prongs, prong connecting means surrounding said heating means engaging said prongs between the upper and lower ends thereof and below the bowl engaging surfaces thereof, and a tray supporting the lower ends of said prongs.

6. In a support for a coffee maker bowl, radially disposed bowl positioning prongs extending above the bowl bottom and engaging the sides of the bowl above said bottom, heating means disposed axially within said prongs, means inside said prongs and surrounding the axis of said heating means connecting said prongs and forming a rigid unit, and a base member carrying said prongs and said heating and connecting means and having prongs rigidly united therewith to form a unit.

7. In combination, a bowl, heating means for the bottom thereof spaced below the latter, outwardly extending isolated radial prongs supporting said bowl above said heating means and engaging the bowl sides at points disposed radially above the heating means and so closely spaced as to inhibit tilting of the bowl, and a plurality of prong connecting means, one surrounding the axis of said heating means and the other supporting the prongs and both connected to said prongs at radially spaced points.

8. In a heater for coffee maker bowls, a bowl support having individual bowl positioning prongs co-operating to present a bowl clasp within the upper ends of said prongs and having a constricted portion beneath said clasp, prong connecting means disposed axially of said prongs below said clasp and engaging said prongs intermediate their ends, heating means disposed axially within said connecting means and below said clasp, and means forming a tray supporting the lower ends of said prong members and having connections forming a unitary structure of the same with said prong members and said prong connecting means.

9. In a coffee maker or the like, a rigid substantially conical heater support having an apex and a substantially wider base, heater means at its apex, a peripheral tray portion surrounding its substantially wider base, and a bowl support seated on said tray portion and providing a bowl seat above said heating means.

10. In a coffee maker or the like, a rigid substantially conical heater support having an apex and a substantially wider base, heater means at its apex, a peripheral tray portion surrounding its substantially wider base, and a plurality of radially arranged bowl supporting prongs co-operating to form a bowl clasp within the upper ends thereof and each having one end seated on said tray portion and the opposite end engaging and positioning the side of a bowl.

11. In a coffee maker or the like, a rigid substantially conical heater support having an apex and a substantially wider base, heater means at its apex, a peripheral tray portion surrounding its substantially wider base, a plurality of radially arranged bowl supporting prongs co-operating to form a bowl clasp within the upper ends thereof and each having one end seated on said tray portion and the opposite end engaging and positioning the side of a bowl, and means connecting together said prongs intermediate their ends.

12. In combination, a plurality of radially arranged spaced prongs presenting upwardly and outwardly inclined bowl receiving and positioning means and having downwardly extending supporting feet, means below said positioning means and above said feet connecting said prongs while providing an axial heater passage, and a heater support having a heater on its upper end substantially within said connecting means and also having a wide base having a peripheral tray portion thereon engaged by said supporting feet.

13. A combined heater and stand for coffee makers or the like comprising a raised hollow heater support having a peripheral tray portion around its base and the bottom of said raised support forming the bottom of said tray portion and the top of said raised support forming the top of the said tray portion.

14. A combined heater and stand for coffee makers or the like comprising a fluid tight heater support having a hollow raised heater carrying portion and a peripheral tray portion around its base, said support having its bottom forming the bottom of said tray portion and providing a liquid fluid reservoir between the heater and said tray bottom, and a wick in said reservoir and extending through said raised portion.

15. A combined heater and stand for coffee makers or the like comprising a fluid tight heater support having a hollow raised heater carrying portion and a peripheral tray portion around its base, said support having its bottom forming the bottom of said tray portion and providing a liquid fluid reservoir between the heater and said tray bottom, a wick in said reservoir and extending through said raised portion, and a bowl support disposed coaxially with said raised portion and carried on said peripheral tray portion.

16. A combined heater and stand for coffee makers or the like comprising a fluid tight heater support having a hollow raised heater carrying portion and a peripheral tray portion around its base, said support having its bottom forming the bottom of said tray portion and providing a liquid fluid reservoir between the heater and said tray bottom, a wick in said reservoir and extending through said raised portion, and radially arranged rigidly connected bowl receiving prongs disposed coaxially with said raised portion and having their lower ends seated on said tray portion.

17. In combination, a plurality of radially arranged spaced prongs for positioning a bowl to be heated, having a plurality of bowl engaging portions at their upper ends engageable with the side of a bowl and also having downwardly extending supporting feet at their lower ends, and heating means disposed within said feet and having a peripherally located tray portion formed on its base and supporting said feet.

18. In combination, a bowl, a plurality of radially arranged spaced prongs receiving and supporting said bowl, each having a bowl engaging prong portion at its upper end engageable with the side of the bowl and a downwardly extending supporting foot at its lower end, and means connecting said prongs together below said bowl engaging portion co-operating with said prongs in providing an axial heater passage from bottom to top of the portion thereof below the bowl thereon.

19. A combined heater and stand for coffee makers or the like comprising a raised heater support having a peripherally disposed tray portion at its base fixed thereto and forming a part thereof, heating means carried on the upper end of said support, and a series of radially arranged prongs having outwardly and upwardly extending bowl clasping portions and downwardly extending feet engaging said peripheral tray portion and fixed thereto.

20. A combined heater and stand for coffee makers or the like comprising a raised heater support having a peripherally disposed tray portion at its base fixed thereto and forming a part thereof, heating means carried on the upper end of said support, a series of radially arranged prongs having outwardly and upwardly extending bowl clasping portions, downwardly extending feet fixed to said peripheral tray portion, and a constricted portion between said portions and said feet, and a ring member at said constricted portion connected to said prongs.

In testimony whereof I affix my signature.

ANNE M. BOEVER.